United States Patent
Jow et al.

[11] Patent Number: 5,875,092
[45] Date of Patent: Feb. 23, 1999

[54] PROTON INSERTED RUTHENIUM OXIDE ELECTRODE MATERIAL FOR ELECTROCHEMICAL CAPACITORS

[75] Inventors: T. Richard Jow, Chatham; Jian-Ping Zheng, Eatontown, both of N.J.

[73] Assignee: The United States of America as represented by the Secretary of the Army, Washington, D.C.

[21] Appl. No.: 798,398

[22] Filed: Feb. 7, 1997

[51] Int. Cl.[6] .................................. H01G 9/00; H01G 9/04
[52] U.S. Cl. ................... 361/502; 361/508; 361/516; 361/503; 361/528
[58] Field of Search ......................... 361/503, 516, 361/512, 504, 528, 532, 508, 524, 522, 502; 29/25.03, 25.42; 204/290 F; 205/505, 538; 427/314, 318, 376.3, 376.4, 419.1

[56] References Cited

U.S. PATENT DOCUMENTS

| | | |
|---|---|---|
| 2,800,616 | 7/1957 | Becker . |
| 3,536,963 | 10/1970 | Sohio . |
| 5,358,889 | 10/1994 | Emesh et al. ............................. 437/60 |
| 5,600,535 | 2/1997 | Jow et al. ............................... 361/503 |
| 5,621,609 | 4/1997 | Zheng et al. ............................ 361/503 |

FOREIGN PATENT DOCUMENTS 1196683   11/1985   Canada .

OTHER PUBLICATIONS

Conway, Journal of the Electrochemical Society, vol. 138, pp. 1539–15, 1991.
Raystrick, Proceedings of First Conference on Capacitors and Similar Energy Storage Devices, Deerfield Beach FL, Dec. 11, 1991, Ansum Enterprises Inc., Boca Raton, FL.
U.S. Pat. Application No. 08/232,901, filed Apr. 21, 1994, Zheng and Jow.

*Primary Examiner*—Kristine Kincaid
*Assistant Examiner*—Anthony Dinkins
*Attorney, Agent, or Firm*—Michael Zelenka

[57] ABSTRACT

A high energy density electrochemical capacitors with electrodes is formed from proton inserted ruthenium oxides (e.g. $HRuO_2.xH_2O$ or $HRuO_2$). The electrode material is formed by reducing ruthenium oxides (e.g. $RuO_2.xH_2O$ or $RuO_2$) using electrochemical method or chemical reaction between ruthenium oxides with acetone or methanol. Electrochemical capacitors with electrodes formed of proton inserted ruthenium oxides possess higher energy density, lower resistance, broader operating temperature range, and longer lifetime than that with electrodes comprised ruthenium oxides.

6 Claims, 4 Drawing Sheets

PROTON INSERTED RUTHENIUM OXIDE ELECTRODE MATERIAL FOR ELECTROCHEMICAL CAPACITORS

GOVERNMENT INTEREST

The invention described herein may be made, used, sold, imported or licensed, by or on behalf of the Government of the United States of America, without the payment to us of any royalties thereon.

BACKGROUND OF THE INVENTION

1. Field of the Invention

This invention relates to electrode materials for electrochemical capacitors. More particularly, the invention relates to such electrodes comprised of proton inserted ruthenium oxide, or other metal oxides or mixed metal oxides which have the maximum energy density.

2. Prior Art

Electrochemical capacitors (EC's) are devices which store electrical energy at the interface between an ionically-conducting electrolyte phase and an electronically conducting electrode material. EC's were first described in a 1957 patent by Becker, U.S. Pat. No. 2,800,616 issued in 1957. The first practical devices were pioneered by SOHIO as described in U.S. Pat. No. 3,536,963 based on the double-layer capacitance developed at the interface between high-area carbon electrodes and sulfuric acid electrolyte solution. A complementary system, but originating from a different electrochemical phenomenon, that is development of pseudocapacitance associated with a surface reaction, was developed by Conway in 1975, in collaboration with Continental Group, Inc. See Can. Pat. No. 1,196,683 issued in 1985 to Craig. The materials possessing pseudocapacitance discovered in Conway et al.'s work are metal oxides which include ruthenium oxide ($RuO_2$), iridium oxide ($IrO_2$), cobalt oxide ($CoO_2$), molybdenum oxide ($MoO_2$), and tungsten oxide ($WO_3$). See Conway, *Journal of the Electrochemical Society*, vol.138, pp. 1539–15, 1991. The most effective material discovered was $RuO_2$ which gives a reversibly accessible pseudocapacitance of many Farads per gram over a 1.4 V range.

Heretofore, $RuO_2$, has been fabricated by the thermal decomposition of ruthenium chloride or hydrous ruthenium chloride. $RuO_2$, like other dioxides of the platinum group, e.g. $RhO_2$, $OSO_2$, and $IrO_2$, exhibits metallic conductivity and possesses the rutile structure. The pseudocapacitance, which arises at the $RuO_2$ and the electrolyte interface, is due to the facile ionic species absorption on the surface of the $RuO_2$ electrode material.

In order to maximize the charge or energy storage per unit weight of oxides in this type of system, it is desirable to maximize the surface area of the electrode material. Such a maximum BET surface area of 130 $m^2/gram$ was achieved by Raistrick for optimized processing. See Raistrick, *Proceedings of First Conference on Capacitors and Similar Energy Storage Devices*, Deerfield Beach, Fla., Dec. 9–11, 1991, Ansum Enterprises Inc., Boca Raton, Fla. The observed capacitance per unit mass (F/g) and the observed capacitance per unit area ($F/cm^2$), which are determined from the measured electrochemical capacitance, the measured surface area, and the known amount of $RuO_2$ present in the electrode, are 380 F/g and 200–300 $mF/cm^2$, respectively, in a 1 V range in sulfuric acid electrolyte. Based on the assumption that one H may be adsorbed on each exposed O atom, a charge density of 200 $mC/cm^2$ is estimated by Raistrick. This suggests that the observed capacitance 380 F/g is the maximum value that can be achieved for $RuO_2$.

During charging of the capacitor, a large number of protons from the electrolyte will react with the $RuO_2.xH_2O$ electrode (see Eqs. (1) to (4)) infra. The use of either the $RuO_2$ film electrodes as described in the Canadian Patent by Craig or the amorphous phase of $RuO_2.xH_2O$ in an electrochemical capacitor will result in a gas production and a loss of water in initial cycles. This is due to the fact that either $RuO_2$ film or $RuO_2.xH_2O$ has an open circuit potential about 1.0 V vs. the saturated calomel electrode (1.24 V vs. standard hydrogen electrode) in a 5.26 mol sulfuric solution. When the capacitor is first charged, protons will be inserted in the negative electrode. At the positive electrode, the further oxidation of ruthenium results in the decomposition of water since the potential of ruthenium oxide is about the potential for the decomposition of water. The reactions at each electrode and the overall reaction can be described as follows:

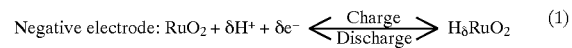

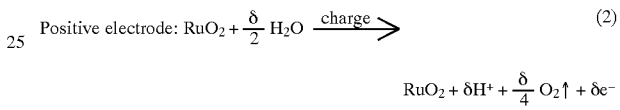

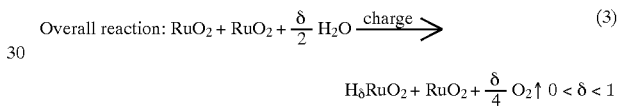

The evolution of oxygen gas at the positive electrode will permeate through the electrolyte and accumulate at the separator. The oxygen evolution causes the increase of the resistance because of the gas accumulation inside the capacitor, reduces the cycle life, and increases the leakage current of the capacitor as described by Conway in 1995. The consumption of water will result in an increase of electrolyte concentration, and therefore an increase of resistivity of the electrolyte. The change of the ion concentration in the electrolyte might cause the increase of the resistance of the capacitor and the reduction of the operational temperature range. Part of the energy used in charging the capacitor was used to decompose water, therefore the energy efficiency is low in the first cycle. Higher efficiency is achieved in later cycles. However, the damage to the cell has already been done. Therefore, it is desirable to eliminate the gas evolution and the increase of resistivity after the initial cycles. The present invention addresses this need.

SUMMARY OF THE INVENTION

Accordingly one object of the present invention is to provide an electrode material with a maximized energy density, a reduced resistance, and an improved lifetime.

This and other objects of the present invention are achieved by providing an electrode material having protons inserted in either a hydrous or anhydrous form of a metal oxide, such as ruthenium oxide. The electrode material as used in the prior art is a hydrous or anhydrous ruthenium oxide which contains no protons at all. The benefits of using proton inserted ruthenium oxide include the maintenance of low resistance, higher efficiency, broader temperature range, and longer cycle life of the capacitors. Electrochemical capacitors comprised of such electrodes material have a maximum energy of over 26.7 Wh/kg.

3

According to the present invention, an electrode material of hydrous or anhydrous proton inserted ruthenium oxide is made with starting material of hydrous or anhydrous ruthenium oxide, $RuO_2.xH_2O$ or $RuO_2$, respectively. The starting material has an open potential of about 1.0 V vs. the saturated calomel electrode in 5 molar sulfuric acid solution. The proton inserted ruthenium oxide can be obtained by either electrochemical or chemical reaction methods. The electrochemical method shifts the potential of the starting material (ruthenium oxide) to −0.5 V in an aqueous electrolyte. The chemical reaction method wets the surface of the starting material with organic solvents such as acetone or methanol.

BRIEF DESCRIPTION OF THE DRAWINGS

These and other features of the invention will be better understood in light of the following Detailed Description of the Invention and the attached drawings wherein.

DETAILED DESCRIPTION OF THE INVENTION

According to the present invention, an electrode material with chemical composition of $H_\delta RuO_2.xH_2O$ is used in electrochemical capacitors, where $0 \leq x \leq 2$ and $\delta = 1 \pm 0.2$, preferably $\delta = 1 \pm 0.1$, and most preferably $\delta = 1$. With this new electrode, capacitors will have a higher energy efficiency, higher energy density, lower resistance, broader temperature range, and longer lifetime. The chemical reaction for this new electrode material during the charge and the discharge processes can be expressed as:

Negative electrode: (4)

Positive electrode: (5)

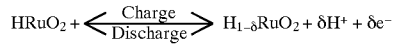

4

Overall reaction: (6)

As shown, the basic electrode processes in the positive and negative electrodes involve the proton transport from one electrode to another electrode. For the capacitor made with proton inserted ruthenium oxide ($HRuO_2.xH_2O$) electrodes, there is no consumption of water and, therefore, no gas evolution occurs at both electrodes.

The electrode material of $HRuO_2$ or $HRuO_2.xH_2O$ is made from $RuO_2$ or $RuO_2.xH_2O$, respectively. The preparation of $RuO_2$ films and $RuO_2.xH_2O$ powders has been described in Can. Pat. by Craig and in U.S. patent application Ser. No. 8/232,901, now abandoned, by Zheng and Jow, which is incorporated herein by reference. It was found that the specific capacitance of $RuO_2.xH_2O$ was strongly dependent on the annealing temperature during the formation of the electrode material. The maximum specific capacitance was obtained at an amorphous phase of $RuO_2.xH_2O$ and was formed at a temperature just below the temperature at which the crystalline phase of $RuO_2.xH_2O$ was formed. A specific capacitance as high as 768 F/g was measured which corresponds to the energy density of 26.7 Wh/kg for a voltage range of 1 V.

After $RuO_2.xH_2O$ powders or $RuO_2$ films (at x=0) are obtained, the $HRuO_2.xH_2O$ electrode material is prepared by two different methods.

First Preferred Embodiment

The first method involves an electrochemical reaction, wherein a working electrode is made with $RuO_2.xH_2O$, e.g. $RuO_2.xH_2O$ powders in a container or pasted on metal foil or metal mesh, or $RuO_2$ films coated on metal substrate. The counter electrode is a large area metal plate or mesh and the reference electrode is a saturated calomel electrode (SCE). The electrolyte is 5.26 M/L $H_2SO_4$ solution. The initial open potential of $RuO_2.xH_2O$ is about 1.0 V vs. SCE. The working electrode potential is shifted to a potential of about 0.5 V vs. SCE. During this shift in potential, current flows between the working and counter electrodes, and protons are inserted into the $RuO_2.xH_2O$ electrode to form $HRuO_2.xH_2O$ until the working electrode is stabilized at the potential about 0.5 V vs. SCE.

Figure 1:
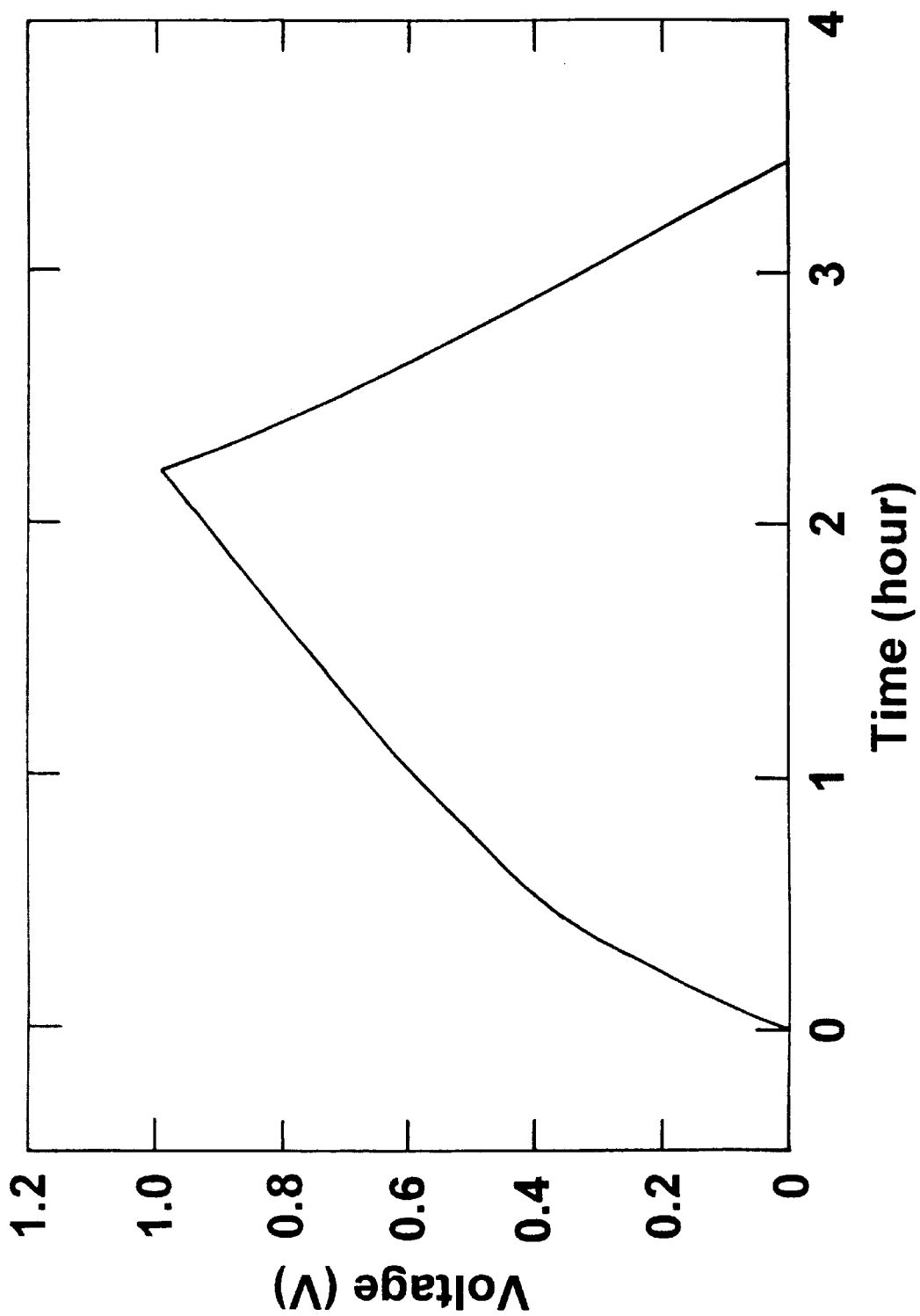
FIG. 1 is a DC charge and discharge curve for an electrochemical capacitor made with $RuO_2.xH_2O$ electrodes at a current density of 4 $mA/cm^2$, wherein the energy efficiency of the capacitor was calculated based on the capacity ratio between the discharge and the charge processes and was about 56% for the first cycle.
Figure 2:
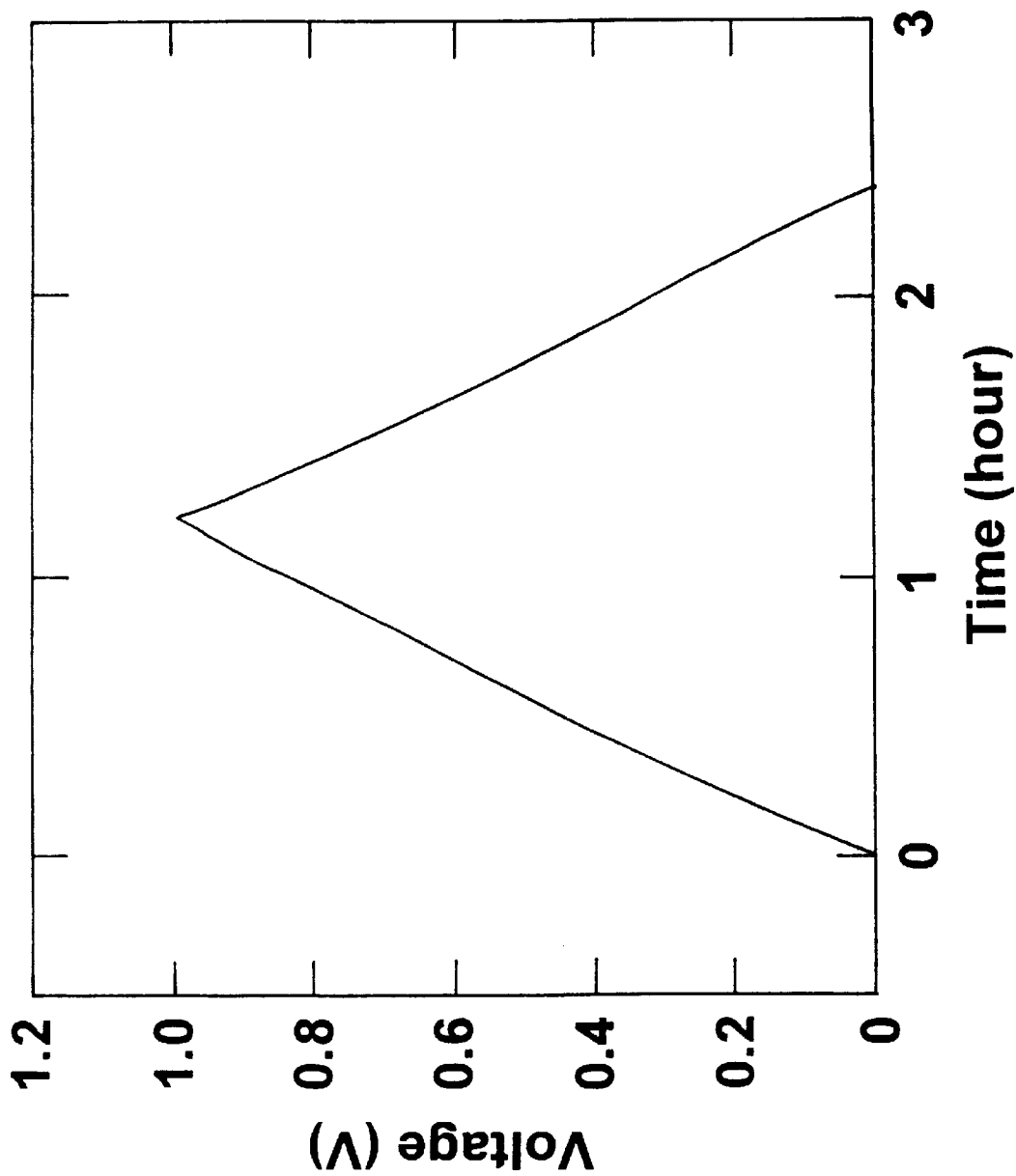
FIG. 2 is a DC charge and discharge curve for an electrochemical capacitor made with $HRuO_2.xH_2O$ electrodes at a current density of 4 $mA/cm^2$, wherein the $HRuO_2.xH_2O$ electrodes were made by the electrochemical method with a starting material of $RuO_2.xH_2O$ and the potential of the electrode was shifted about −0.5V in aqueous solutions and the energy efficiency of the capacitor was about 98%.

FIG. 2 shows the charge and the discharge curve of the first cycle for an electrochemical capacitor made with $HRuO_2.xH_2O$ electrodes. The energy efficiency over 95% was obtained from this capacitor. The resistance increase after the first several cycles was less than 1%. The capacitor could be operated throughout a −52° C. to 73° C. temperature range. About 60,000 charge and discharge cycles were achieved from the capacitor.

Second Preferred Embodiment

The second method involves a chemical reaction with acetone or methanol. Ruthenium oxides react with acetone and methanol, which results in the reduction of ruthenium valence. The valence state can be controlled by the reaction temperature and the time. After $RuO_2.xH_2O$ powders are wetted by methanol at room temperature for about 24 hours, $HRuO_2.xH_2O$ is formed. From this treatment, the open potential of the producer is about 0.55 V vs. SCE in 5.16 M/L $H_2SO_4$ solution.

Figure 3:
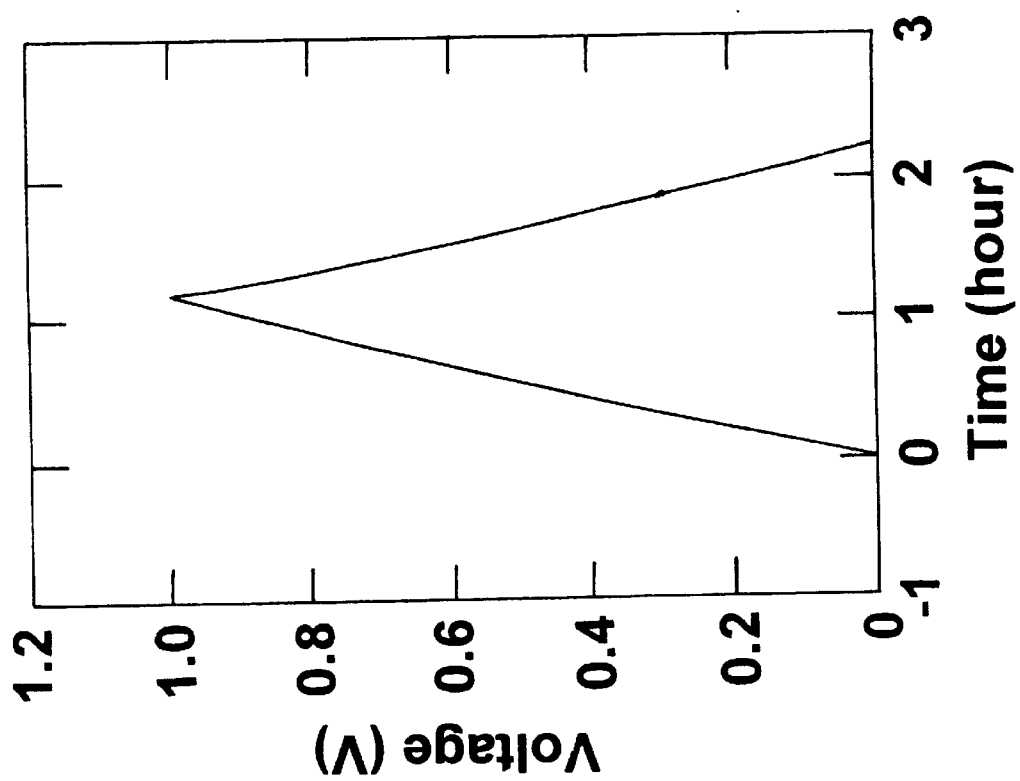
FIG. 3 is a DC charge and discharge curve for an electrochemical capacitor made with $HRuO_2.xH_2O$ electrodes at a current density of 4 $mA/cm^2$, wherein the $HRuO_2.xH_2O$ electrodes were made by the chemical reaction method that the starting material of $RuO_2.xH_2O$ is wetted by methanol and the energy efficiency of the capacitor was about 90%.
Figure 4:
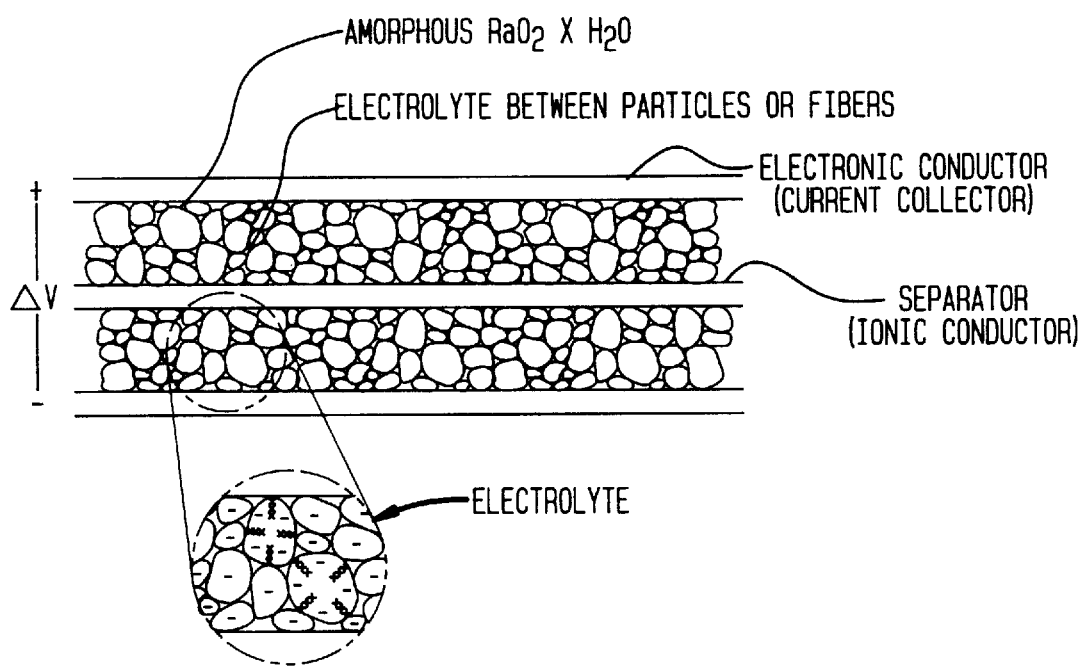
FIG. 4 is a pictorial representation of a typical capacitor as described in this application.

FIG. 3 shows the charge/discharge curve of the first cycle for an electrochemical capacitor made with $HRuO_2.xH_2O$ electrodes. The energy efficiency of about 90% was obtained from this capacitor.

The electrochemical capacitors made with this electrode material are especially suited for commercial applications which require energy sources with high power, low voltage and long cycle life. These applications include: 1) load leveling for batteries in electric/hybrid vehicles during the acceleration and regenerative braking, 2) starting power for engines and fuel cells, 3) pulse power for wireless telecommunication power assist to hybrid vehicles, and 4) backup power for computer and other electronic devices.

Although the present invention has been described with regard to specific embodiments as to how to manufacture the above identified material, those skilled in the art will readily recognize that other variations of manufacturing this material are available. Accordingly, the inventors do not wish to be limited by the present specification, but only by the appended claims.

What is claimed is:

1. A capacitor comprising:

an anode comprised of a proton inserted metal oxide;

an electrolyte; and a cathode comprised of a proton inserted metal oxide.

2. The capacitor of claim 1 wherein the proton inserted metal oxide of the anode is selected from the group consisting of anhydrous ruthenium oxide and hydrous ruthenium oxide.

3. The capacitor of claim 1 wherein the proton inserted metal oxide of the anode is selected from the group consisting of amorphous and crystalline ruthenium oxide.

4. The capacitor of claim 1 wherein the electrolyte is selected from the group consisting of aqueous solutions of $H_2SO_4$, $H_3PO_4$, HCl, $HNO_3$, KOH, NaOH, and $NaCo_3$.

5. The capacitor of claim 1 wherein the proton inserted metal oxide of the cathode is selected from the group consisting of anhydrous ruthenium oxide and hydrous ruthenium oxide.

6. The capacitor of claim 1 wherein the proton inserted metal oxide of the cathode is selected from the group consisting of amorphous and crystalline ruthenium oxide.

* * * * *